Oct. 14, 1924.
W. H. SPENCER
GLARE ELIMINATOR
Filed Feb. 23, 1924
1,511,684
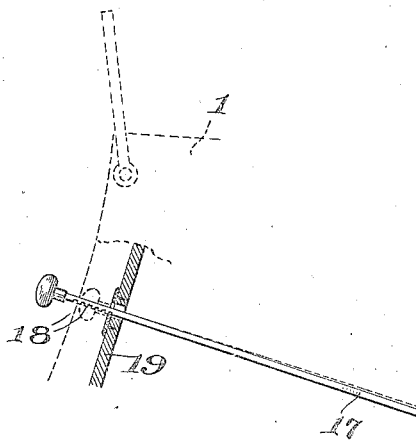
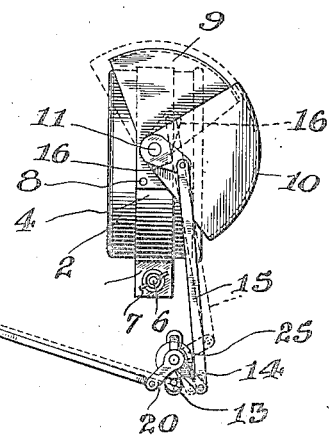
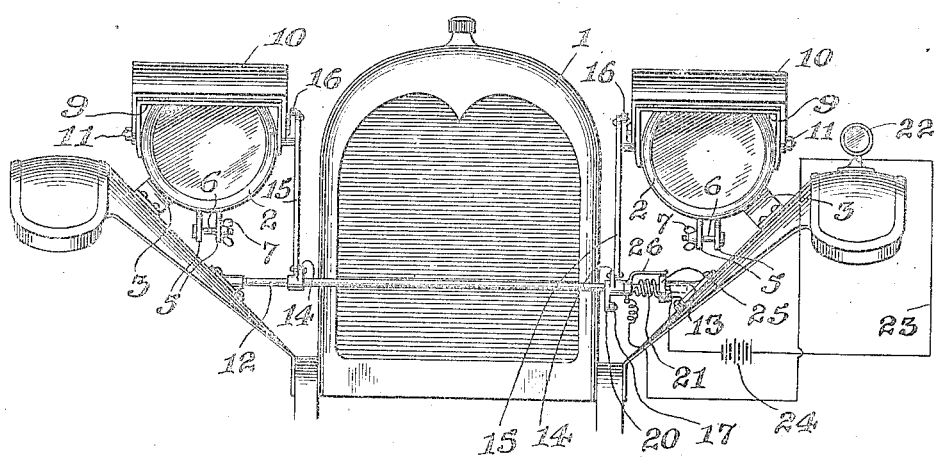
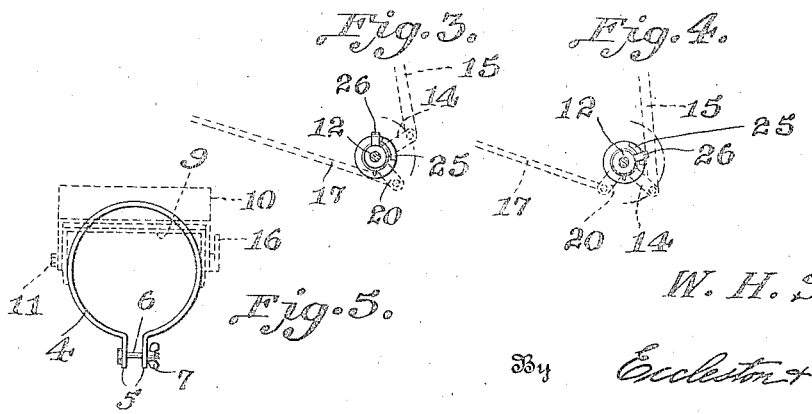
Inventor
W. H. Spencer
By Eccleston & Eccleston
Attorneys Patented Oct. 14, 1924.

1,511,684

UNITED STATES PATENT OFFICE.

WILLIAM H. SPENCER, OF LEXINGTON, NORTH CAROLINA.

GLARE ELIMINATOR.

Application filed February 28, 1924. Serial No. 694,614.

*To all whom it may concern:*

Be it known that I, WILLIAM H. SPENCER, a citizen of United States, residing at Lexington, in the county of Davidson and State of North Carolina, have invented certain new and useful Improvements in Glare Eliminators, of which the following is a full, clear, and exact description.

This invention relates to glare eliminators for automobiles and particularly to that type in which a hood of opaque material is pivoted to the headlight and is controlled by the operator of the automobile through the medium of mechanism, electrical or otherwise, which is positioned adjacent the driver's seat and is operatively connected with the pivoted hood.

It is an object of the present invention to generally improve the construction of glare eliminators of the foregoing type and also to provide means whereby they may be quickly and easily attached to the ordinary headlights without the use of tools.

Another object of the invention resides in the provision of an auxiliary light mounted on the left front mudguard which is automatically illuminated as the glare eliminator commences its movement to light-obstructing position.

Other objects and advantages of the invention will be apparent from the following description when taken in connection with the accompanying drawings in which;

Figure 1 is a side elevation of an automobile headlight with the improved glare-eliminator in place.

Figure 2 is a fragmentary front elevation of an automobile also showing the glare eliminators in operative position.

Figures 3 and 4 are detail views of the switch mechanism for the auxiliary light showing the same in two different positions, and Figure 5 is a front elevation of the band for attaching the eliminator to the headlight.

Referring to the drawings more in detail, the numeral 1 indicates an automobile provided with two headlights 2 supported from the front mudguards by means of the brackets 3 in the usual manner.

The present invention contemplates the use of a glare eliminator for attachment to headlights of any of the well-known types, the headlights 2 shown on the drawings being merely illustrative of the drum type.

In order that the apparatus may be attached without the use of tools and without mutilating and scarring the headlight casing, I provide a band 4 of suitable width which is formed with the downwardly-extending lugs 5 for the reception of bolt 6 and wing nuts 7. To the sides of the band 4 is fixedly attached, by means of rivets or the like 8, an arch-shaped hood 9 which envelopes the upper portion of the headlight 2 and slightly overhangs the lens thereof.

For the purpose of regulating the glare from the headlights 2 and for entirely eliminating the light if desired, I have devised the arch-shaped hood 10 which is pivotally connected to the band 4 through bearings 11. It is of paramount importance that the hood 10 be so connected as to be controlled from the dash of the automobile and to this end a shaft 12 is rotatably mounted in bearings 13 on the front mudguards and is provided with rigid arms 14 which are connected by links 15 with arms 16 which are rigidly connected with the movable hood 10. A rod 17 provided with notches 18 extends through the dash 19 at a point easily accessible to the operator and has its opposite end connected to arm 20 which is fixedly secured to the shaft 12. By adjusting the rod 17 on the dash, it will be apparent that the hood 10 may be moved and locked at any point from the upper or dotted line position shown in Figure 1 to the lower or full line position shown in the same figure. A torsion spring 21 has one end attached to shaft 12 and its opposite end secured to the bearing 13 and thus operates to automatically raise the hood 10 to its upper position whenever the rod 17 is released from the dash 19.

Should the headlights be entirely shut off as indicated in Figure 1 it is desirable that some auxiliary light be provided as an indication of the presence and position of the automobile to approaching vehicles. I have accordingly devised an electric lamp 22 mounted preferably on the left front mudguard. This lamp is placed in a circuit 23 which includes the battery 24 and a rotatable switch mounted on the shaft 12. The switch comprises a disk of insulation material which is fixed to bracket 13 shown at the right of Figure 2 and supports an elongated contact 25 which cooperates with the contact 26 carried by shaft 12. As soon as the hood 10 starts downward across the front of the headlight 2, the contact 26 will engage the contact 25 and close the circuit through the lamp 22. The latter may be provided with a lens of red or other color which will give effective warning of the presence of the automobile.

From the foregoing description is will be apparent that I have devised a novel glare eliminator which may be adjusted from the driver's seat so as to partly or wholly cover the headlight, and also automatic means for giving a visual indication of the presence of the automobile to approaching vehicles.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

Having fully described the invention, what I claim as new and desire to secure by Letters Patent is:

1. A glare eliminator including in combination a headlight, a pivotally mounted hood on said headlight, a rotatable shaft, means operable from the automobile dash for controlling the movements of said shaft, links connecting said shaft and hood, an electric circuit including an auxiliary light to one side of the headlight, and a rotary switch in said circuit mounted on said shaft, said switch being constructed and arranged to close the circuit to the auxiliary light when the hood is moved toward its light-obstructing position.

2. A glare eliminator including in combination a headlight, a pivotally mounted hood on said headlight, a rotatable shaft, means operable from the automobile dash for controlling the movements of said shaft, links connecting said shaft and hood, a spring on said shaft for normally moving the hood to the upper limit of its path of travel, an electric circuit including an auxiliary light to one side of the headlight, and a rotary switch in said circuit, said switch being constructed and arranged to close the circuit to the auxiliary light when the hood is moved toward its light-obstructing position.

WILLIAM H. SPENCER.

Witness:
E. C. BYERLY.